(12) United States Patent
Pelligrino

(10) Patent No.: US 7,874,568 B1
(45) Date of Patent: Jan. 25, 2011

(54) METHOD FOR REMOTELY LAUNCHING AND SECURELY RETRIEVING A TRAILERED WATERCRAFT

(75) Inventor: Paul A. Pelligrino, Muskego, WI (US)

(73) Assignee: Pages, LLC, Muskego, WI (US)

( * ) Notice: Subject to any disclaimer, the term of this patent is extended or adjusted under 35 U.S.C. 154(b) by 0 days.

(21) Appl. No.: 12/567,159

(22) Filed: Sep. 25, 2009

Related U.S. Application Data

(62) Division of application No. 11/779,225, filed on Jul. 17, 2007, now Pat. No. 7,614,635.

(51) Int. Cl.
*B60P 3/10* (2006.01)

(52) U.S. Cl. .................... 280/414.1; 414/559

(58) Field of Classification Search ............ 280/414.1; 414/559
See application file for complete search history.

(56) References Cited

U.S. PATENT DOCUMENTS

| | | | |
|---|---|---|---|
| 3,357,581 A * | 12/1967 | Scott | ............ 414/478 |
| 3,750,805 A | 8/1973 | Finney | |
| 3,831,790 A * | 8/1974 | Farris | ............ 414/522 |
| 3,912,302 A | 10/1975 | Patterson | |
| 3,989,267 A | 11/1976 | Robinson | |
| 4,114,920 A | 9/1978 | Boettcher | |
| 4,463,965 A | 8/1984 | Lawson | |
| 4,623,161 A | 11/1986 | Sprague | |
| 4,626,162 A * | 12/1986 | Parisi | ............ 414/479 |
| 4,641,851 A | 2/1987 | Knies | |
| 5,120,079 A | 6/1992 | Boggs | |
| 5,599,035 A | 2/1997 | Spence | |
| 5,895,185 A | 4/1999 | Spence | |
| 6,402,445 B1 | 6/2002 | Smiley | |
| 6,598,896 B1 | 7/2003 | Hyslop | |
| 7,179,041 B2 * | 2/2007 | Ebbenga | ............ 414/494 |
| 7,380,809 B2 * | 6/2008 | McGinty et al. | ......... 280/414.1 |
| 2004/0037686 A1 | 2/2004 | Zietlow et al. | |

FOREIGN PATENT DOCUMENTS

WO  WO 8705568 A1 *  9/1987

\* cited by examiner

*Primary Examiner*—Kevin Hurley
(74) *Attorney, Agent, or Firm*—John K. McCormick

(57) ABSTRACT

A boat trailer modified to include a dolly and dolly track, the dolly including a hook triggering mechanism, a bow cradle and a slidable hooking mechanism for engaging a watercraft bow ring at a wide range misalignment with the centerline of the trailer. The trailer further including a remote controlled power winch with an automatic shut off for stopping the power winch when a watercraft is fully loaded. The invention providing a means for a single user to launch a securely retrieve a watercraft to and from a watercraft trailer.

3 Claims, 14 Drawing Sheets

METHOD FOR REMOTELY LAUNCHING AND SECURELY RETRIEVING A TRAILERED WATERCRAFT

This application is a divisional application which claims the benefit of application Ser. No. 11/779,225, filed on Jul. 17, 2007 now U.S. Pat. No. 7,614,635, filed in the name of the same inventor.

TECHNICAL FIELD OF THE INVENTION

The present invention relates to trailered vehicles and trailers and more particularly to a trailer equipped with a means for a single person to remotely launch and securely retrieve a vehicle such as a boat, jet-ski or the like.

BACKGROUND OF THE INVENTION

Conventional watercraft trailers allow a user the convenience and pleasure of transporting a boat, jet ski or the like to a variety of locations for the enjoyment of the watercraft they are trailering. The trailer allows the watercraft being trailered to be securely and safely towed by a motorized vehicle from place to place. The trailer further permits the user to store the trailered watercraft safely in a garage or on the individual's own property without incurring additional storage expense. However, presently existing trailers have a variety of limitations which detract from their above noted conveniences.

In the case of watercraft trailers, the trailer is typically backed down a ramp that extends into the water such that the boat or jet ski can then be floated off of the trailer for launching the watercraft and driving the watercraft part way onto the trailer for retrieving the watercraft. Typically, the launching or retrieving of a watercraft requires two people, one person in the watercraft to secure and control the watercraft when the watercraft is in the water and another person to operate a winch mechanism during the launching and retrieval of the watercraft to and from a trailer.

In the retrieval of a watercraft, this problem is exacerbated by the fact that the trailer is at a downward angle of 10 degrees or greater due to the ramp the trailer is on while the watercraft is level on the water thereby resulting in having the bow of the watercraft at an angle different from the bow cradle alignment guides and latching mechanism of the trailer. Consequently, a user typically attaches a winch strap, attached to a winch on the trailer, to a bow ring in order to pull the watercraft into alignment with the bow cradle alignment guides.

When there is a wind blowing or if there is turbulent water, aligning the watercraft to the trailer for retrieval becomes even more difficult as the watercraft tends to drift off of its original position for retrieval. In these situations, it is not unusual for the person operating the winch to have to wade into the water to assist in aligning the watercraft to the trailer and in connecting the winch line to the bow of the watercraft and further operating the winch to fully pull the watercraft into the proper position on the cradle bunks and onto the trailer.

Because of the need for the watercraft to be secured to the winch line for movement onto or off of a trailer, the watercraft operator must leave the cockpit of the watercraft to secure or release the winch line from the bow of the watercraft, thereby leaving the watercraft out of control for a period of time or necessitating a third person at the controls of the watercraft. Thus, the current means for the launching or retrieval of a watercraft, although greatly increasing the flexibility and pleasure offered to watercraft users, generally requires the cooperative efforts of two or more people to launch and/or retrieve the watercraft safely and securely.

Once on a trailer, a watercraft can then be secured with tie downs or the like to prevent movement and damage during transportation of the watercraft and trailer.

DESCRIPTION OF RELATED ART

U.S. Pat. No. 3,963,263 issued to Whitlock on Jun. 15, 1976 teaches an automatic boat latch, however, this latch does not provide an automatic release for use when launching a boat.

U.S. Pat. No. 3,831,790 issued to Farris on Aug. 27, 1974 teaches a kit comprising a wheeled carriage and rails adapted to be secured to a boat trailer for facilitating the loading and unloading of a boat by securing the forward end of a boat after engaging the bow of the boat but before releasing the catch previously engaged with the eye on the bow of the boat. However, this kit requires the use of the boats power to fully retrieve the boat to the trailer.

U.S. Pat. No. 3,750,805 issued to Finney on Aug. 7, 1973 teaches a wheeled dolly and track structure attached to a trailer for loading a boat to a boat trailer. However, this structure requires the use of the boat's power to fully retrieve the boat to the trailer.

U.S. Pat. Application Publication No. 2004/0037686 by Zietlow et al. teaches a boat trailer modified to include a load bearing trolley movable along a single track parallel to the length of the trailer. The trolley having an automatic latching and unlatching mechanism that operates depending upon the position of the trolley. However, the docking plate has limited movement relative to the bow of the watercraft and requires a flexible target antenna attached to the docking plate in order for the occupant to position the watercraft onto the docking plate accurately enough to engage the latching mechanism onto the bow ring.

None of the above inventions, taken either singly or taken in combination, is seen to describe the instant invention as claimed. Therefore, an improved trailer solving the aforementioned problems is desired.

SUMMARY OF THE INVENTION

The present invention is directed at an apparatus and means for automatically unloading and retrieving a vehicle to and from a trailer by a single individual. In addition, this invention allows a single user to retrieve a watercraft to a trailer with a substantial initial misalignment of the watercraft to the trailer and still easily and successfully retrieve and secure the watercraft to the trailer.

Other features and advantages of this disclosure will become apparent to one skilled in the art upon examination of the following drawings and detailed description. It is intended that all such additional features and advantages be included within the scope of the present invention.

Reference will now be made in detail to the description of the invention as illustrated in the drawings. Although the invention is described in connection with the drawings, there is no intent to limit the invention to the embodiment or embodiments disclosed therein. On the contrary, the intent is to include all alternatives, modifications, and equivalents included within the scope and spirit of the invention as defined by the appended claims.

BRIEF DESCRIPTION OF THE DRAWINGS

The present invention will be apparent to those skilled in the art by reading the following description of the preferred embodiments of the invention taken in conjunction with the attached drawings, which are only for illustration, and are thus not meant to be limiting the present invention, and in which.

DESCRIPTION OF THE PREFERRED EMBODIMENTS

Figure 1:
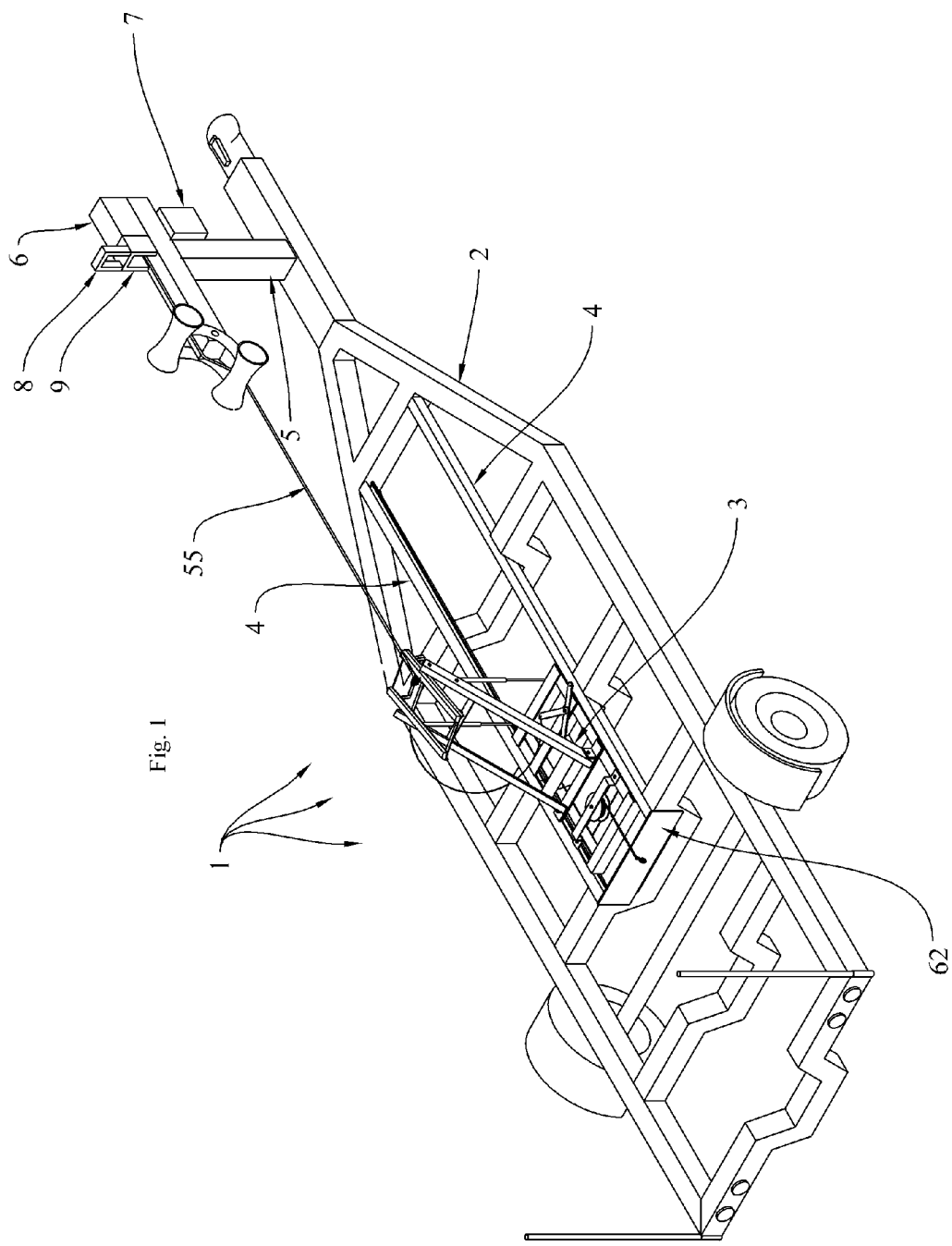
FIG. 1 is a perspective view of the subject boat launching and retrieving invention with the launching and retrieving apparatus in its most rearward position.
Figure 2:
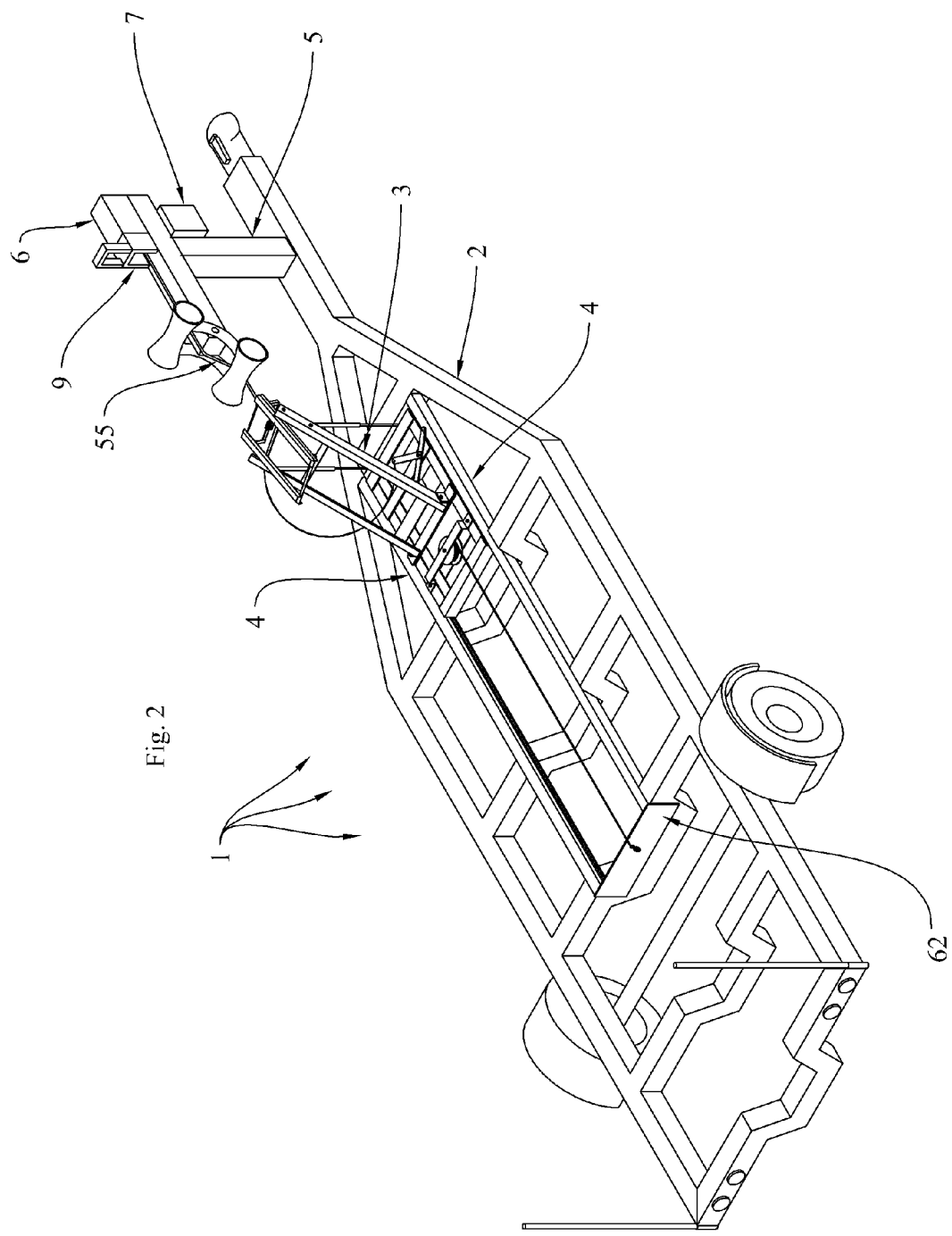
FIG. 2 is a perspective view of the subject boat launching and retrieving invention with the launching and retrieving apparatus in its most forward position.

FIG. 1 depicts the present invention 1 as installed on a watercraft trailer 2 with the dolly assembly 3 shown in its most rearward position. The watercraft trailer, as commonly known in the art, having longitudinal supports, a rear end, a plurality of trailer wheels disposed proximate the rear end of the of the supports. Hull support rollers or support boards, as are commonly known in the art, are not depicted in the figures as they would interfere with the drawings of the present invention. A movable dolly means comprising a dolly assembly 3 that is movably retained between two dolly track rails 4 which are fixedly attached to the watercraft trailer 2. Toward the front of the trailer 2 is the post arm 5 to which is attached a power winch means comprising a power winch assembly 6, an electrical control box 7 and a combined power winch strap control device 9 with an automatic shutoff switch 8. FIG. 2 depicts the present invention 1 as installed on a watercraft trailer 2 with the dolly assembly 3 in its most forward position.

Figure 3:
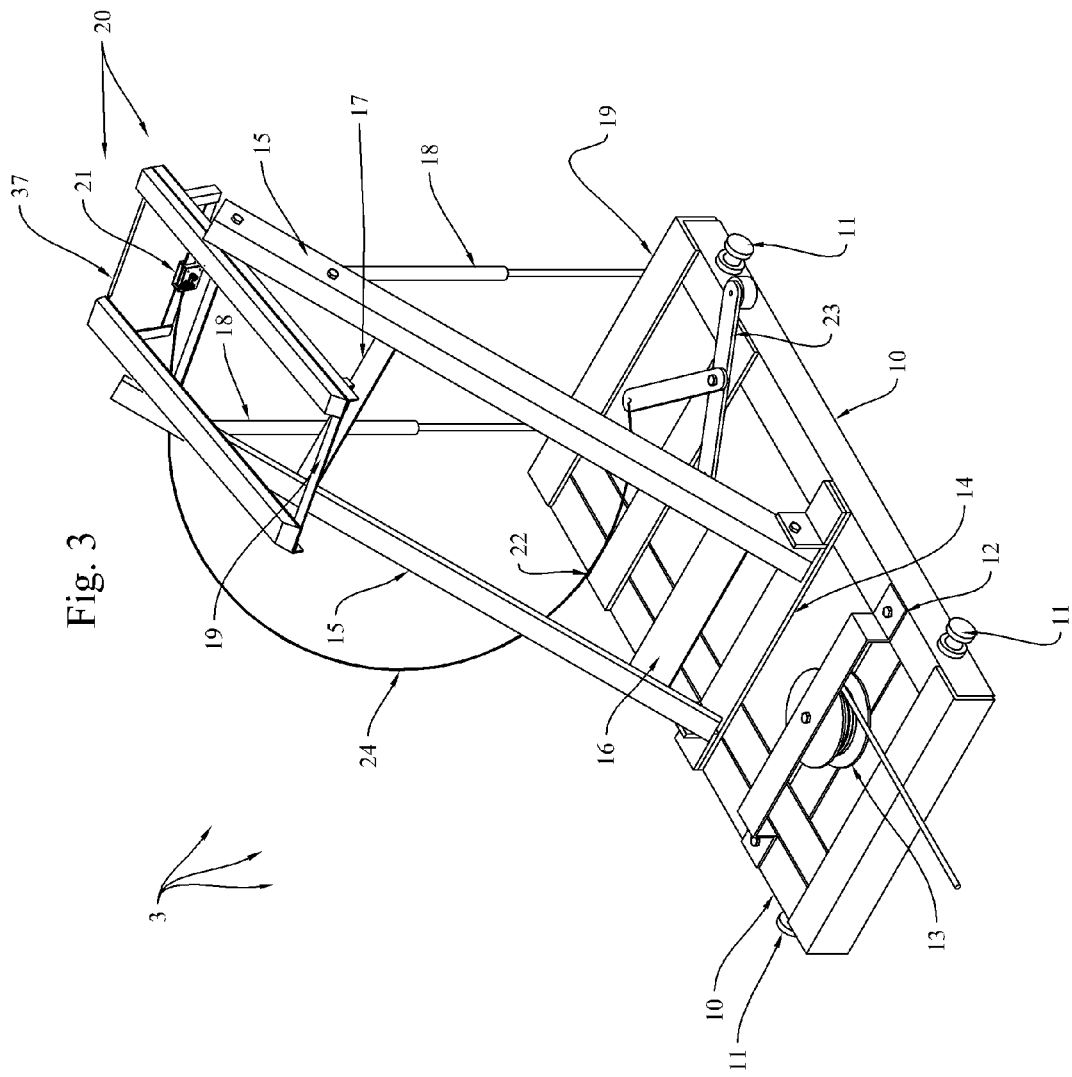
FIG. 3 is a perspective view of the dolly assembly of the present invention.
Figure 14:
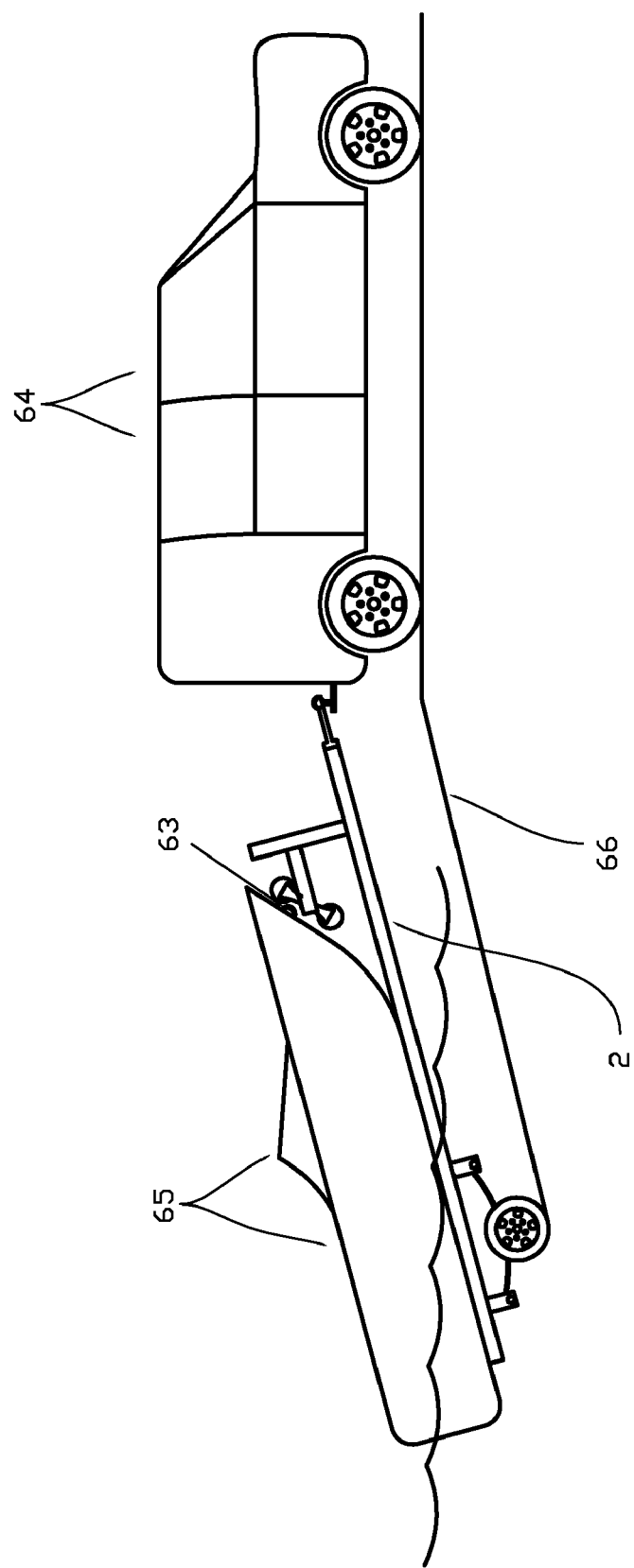
FIG. 14 is a side planar view of a watercraft on a trailer which is connected to a tow vehicle.

FIG. 3 is a perspective view of the dolly assembly 3. The dolly assembly comprises two dolly frame rails 10. Attached near each end of the dolly frame rails 10 on the outside edges are four (4) rotatable dolly guide wheels 11 (only three are depicted). At each end of the dolly assembly 3 are end support bars 61 and 19. Near the rear end support bar 61 is a first support bar 12 to which is mounted a tension means comprising one (1) thirty pound constant tensioner cable wheel 13 that are well known in the art. The cable of the constant tensioner being attached at one end to the cable wheel 13 and at the other end to the rear of the dolly track rails 4 on the track strut 62 as shown in FIGS. 1 and 2. Towards the middle of the dolly frame rails 10 is mounted a second support bar 14 to which is pivotably attached two cradle frame rails 15, one cradle frame rail near each side of the dolly frame rails 10. Third and fourth support bars 16 and 17 connect the two cradle frame rails 15 for rigidity. Towards the upper ends of the cradle frame rails 15 are mounted two (2) sixty pound air shocks 18 with each air shock 18 being attached on a cradle frame rail 15 at a first end and to the forward end support bar 19 that is mounted to the front of the dolly frame rails 10 at the second end. At the upper end of the cradle frame rails 15 are pivotally mounted a bow cradle assembly 20 for receiving the bow of a boat. Attached to the forward end of the bow cradle assembly 20 is a hooking mechanism 21 for automatically engaging a bow hook into a bow ring 63 (shown in FIG. 14) attached to the bow of a boat 65 (shown in FIG. 14). The hooking mechanism 21 and its operation will be described in greater detail below.

Attached to the dolly frame rails 10 between the second support bar 14 and the front end support bar 19 is a fifth support bar 22. Pivotally attached to the fifth support bar 22 is a spring biased triggering mechanism 23. A cable 24 is attached at a first end to the triggering mechanism 23 and at a second end to the hooking mechanism 21, the operation of which will be described in greater detail below.

Figure 4:
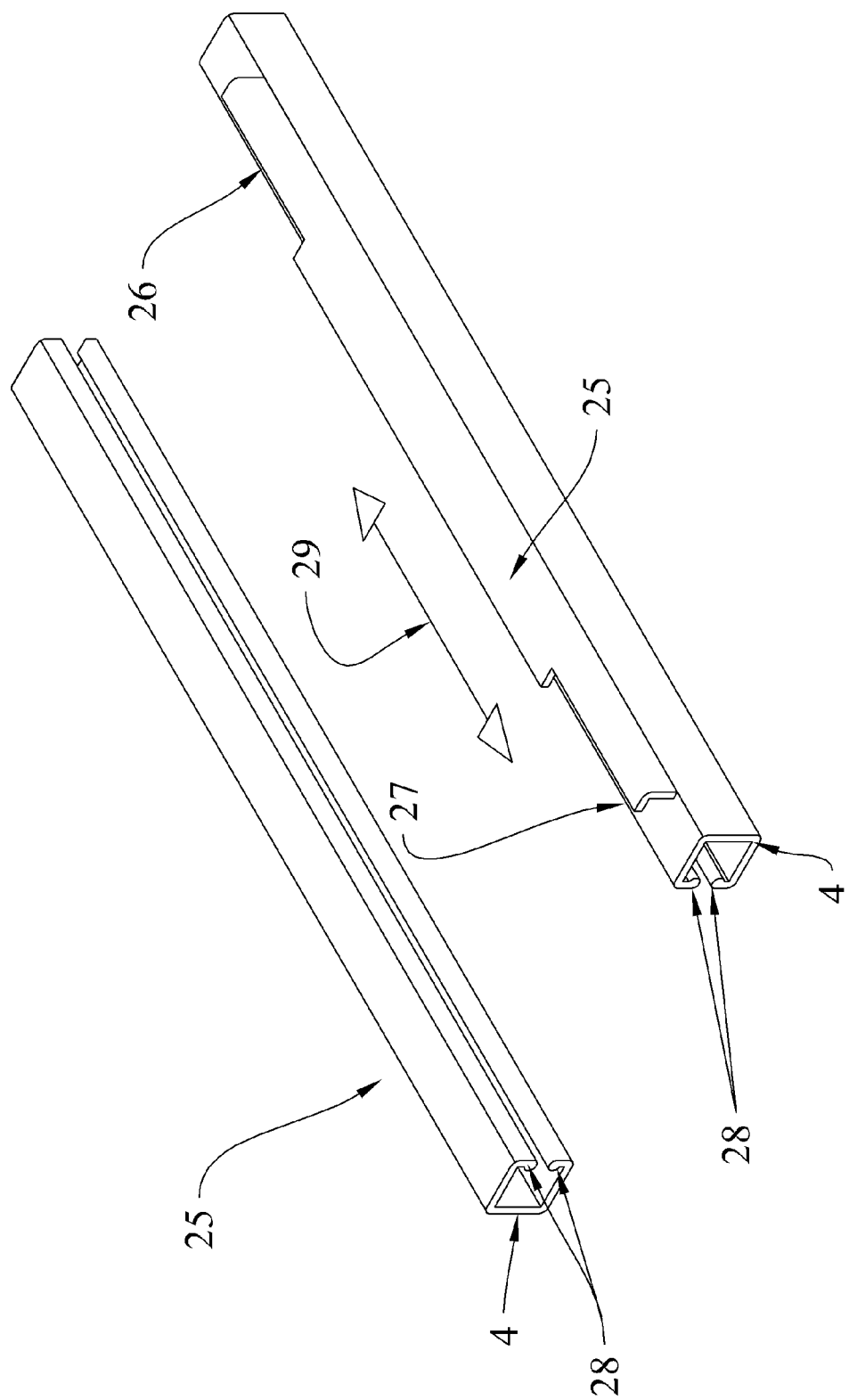
FIG. 4 is a perspective view of the dolly track rails and the position lever rail of the present invention.

FIG. 4 is a perspective view of the dolly track rails 4 with the position lever rail 25 fixedly attached to one of the dolly track rails 4. There are forward 26 and rearward 27 cutouts in the position lever rail 25 used for activating the hooking mechanism 21 as will be described later. The inside rolled edge 28 of the dolly track rails 4 is where the rotatable dolly guide wheels 11 operate moving in a backward and forward direction on the dolly track rails 4 as indicated by the arrow 29.

Figure 5:
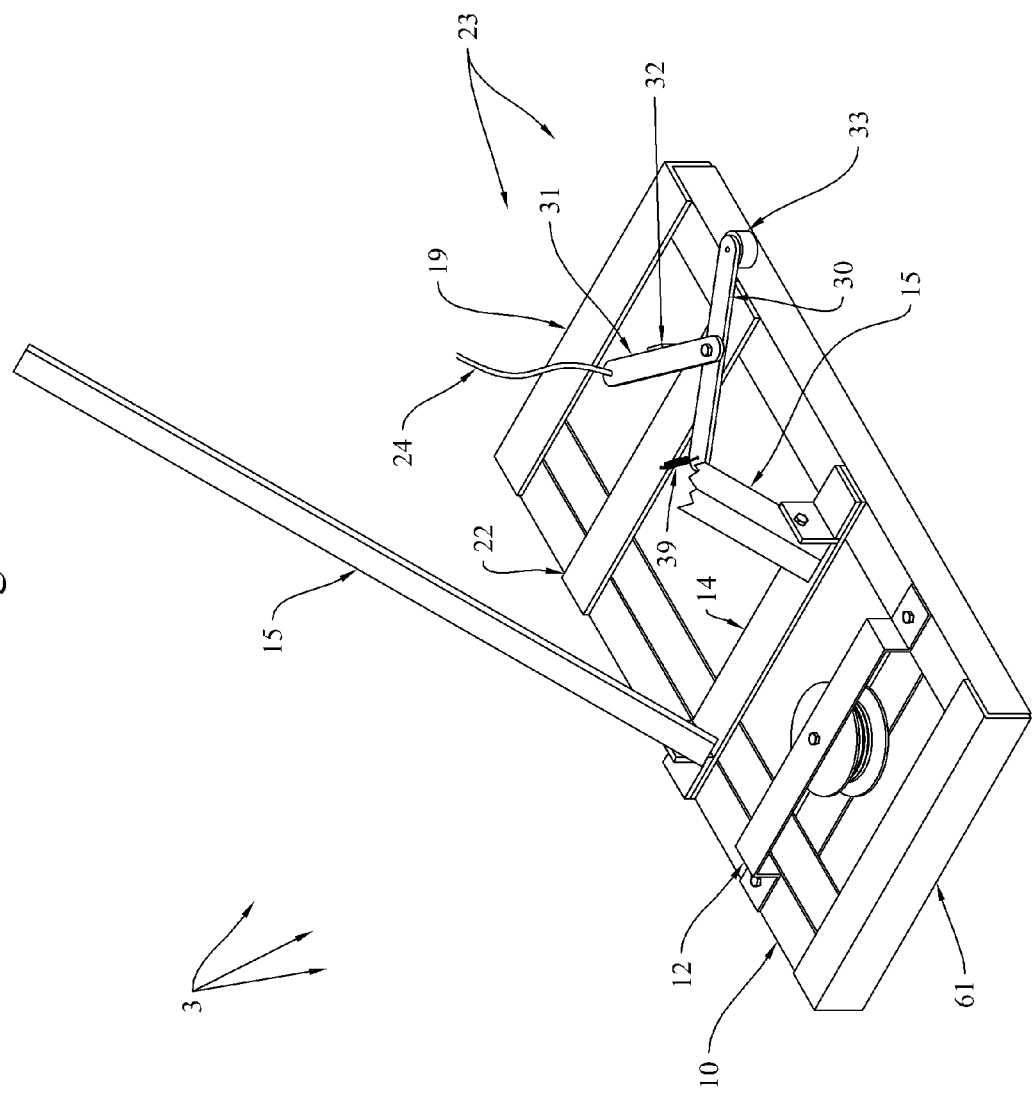
FIG. 5 is a partial perspective view of the dolly assembly depicting the triggering mechanism of the present invention.

FIG. 5 is a partial view of the dolly assembly 3 depicting the triggering means comprising a triggering mechanism 23. The triggering mechanism 23 has pivotally attached to the fifth support bar 22 a first triggering linkage 30 and second triggering linkage 31. At a first end of the first triggering linkage 30 is a roller 33 and at the second end is an expansion spring 39 which is also attached to the fifth support bar 22. The expansion spring 39 keeps the first triggering linkage 30 and the roller 33 biased in an outward direction. As the dolly assembly 3 moves linearly along the dolly track 4, the roller 33 on the first triggering linkage 30 intersects one of the cutouts 26 or 27 in the position lever rail 25 thereby pivoting the first triggering linkage 30. As the first triggering linkage 30 pivots, a second end of the first triggering linkage 30 engages a tab 32 on the second triggering linkage 31 causing the second triggering linkage 31 to pivot causing the cable 24 that is attached at one end of the second triggering linkage 31 to move thereby activating the hooking mechanism 21 as will be described later.

Figure 6:
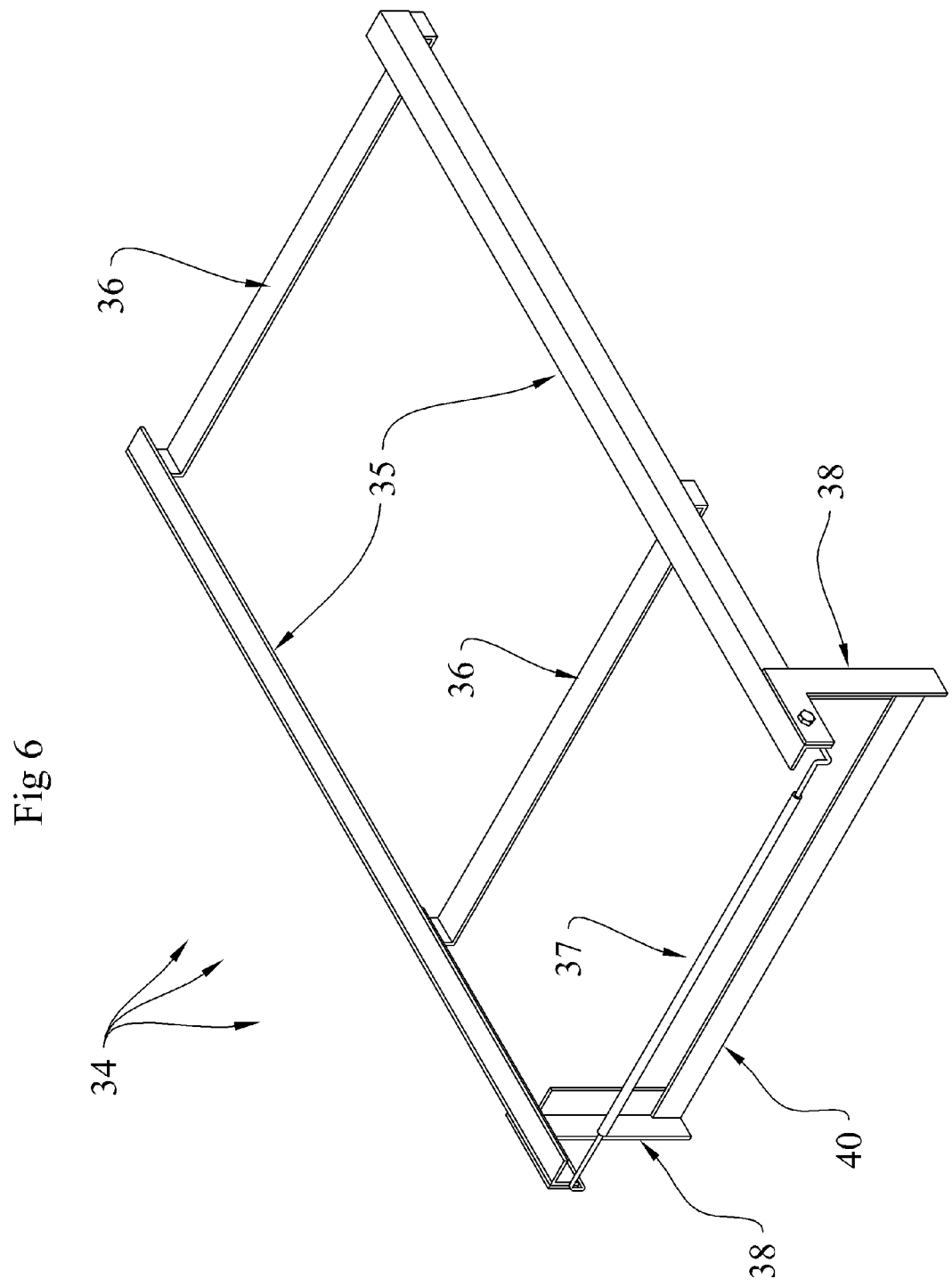
FIG. 6 is a perspective view of the bow cradle frame of the present invention.

FIG. 6 depicts the bow cradle frame 34 which consists of two bow cradle assembly rails 35 supported by two cross-member supports 36. There is a bow stop 37 adjustably mounted to a first end of the bow cradle assembly rails 35. Pivotably mounted to the first end of the bow cradle assembly rails 35 are two hook mechanism support bars 38. Longitudinally attached to the two hook mechanism support bars 38 is the hook mechanism slide bar 40.

Figure 7:
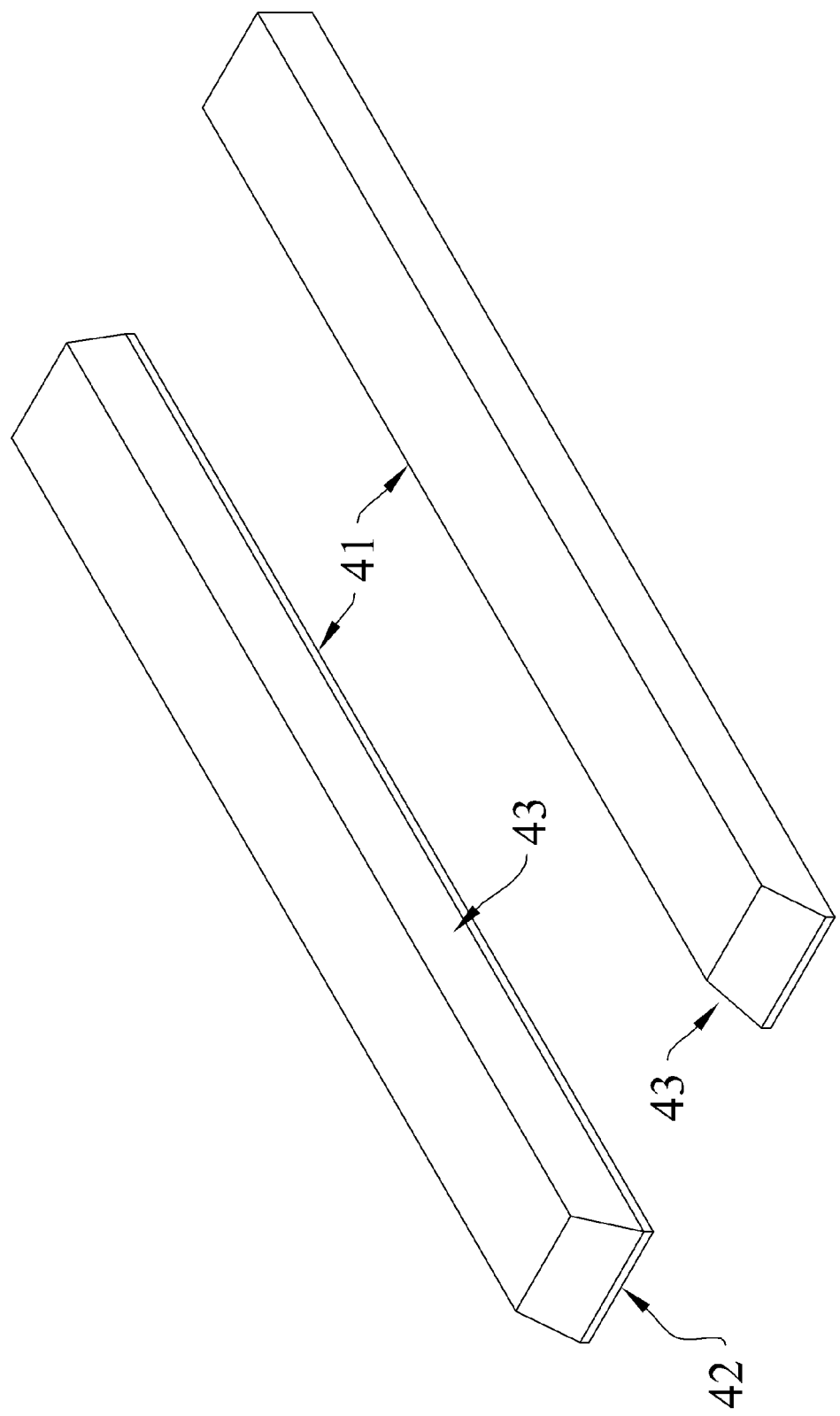
FIG. 7 is a perspective view of the bow cradle alignment guides of the present invention.

FIG. 7 depicts the padded bow protector and alignment guides 41 which have the ends 42 and inside edges 43 tapered to accept the bow of a boat. The alignment guides 41 are mounted to the top of the bow cradle assembly rails 35 shown in FIG. 8.

Figure 8:
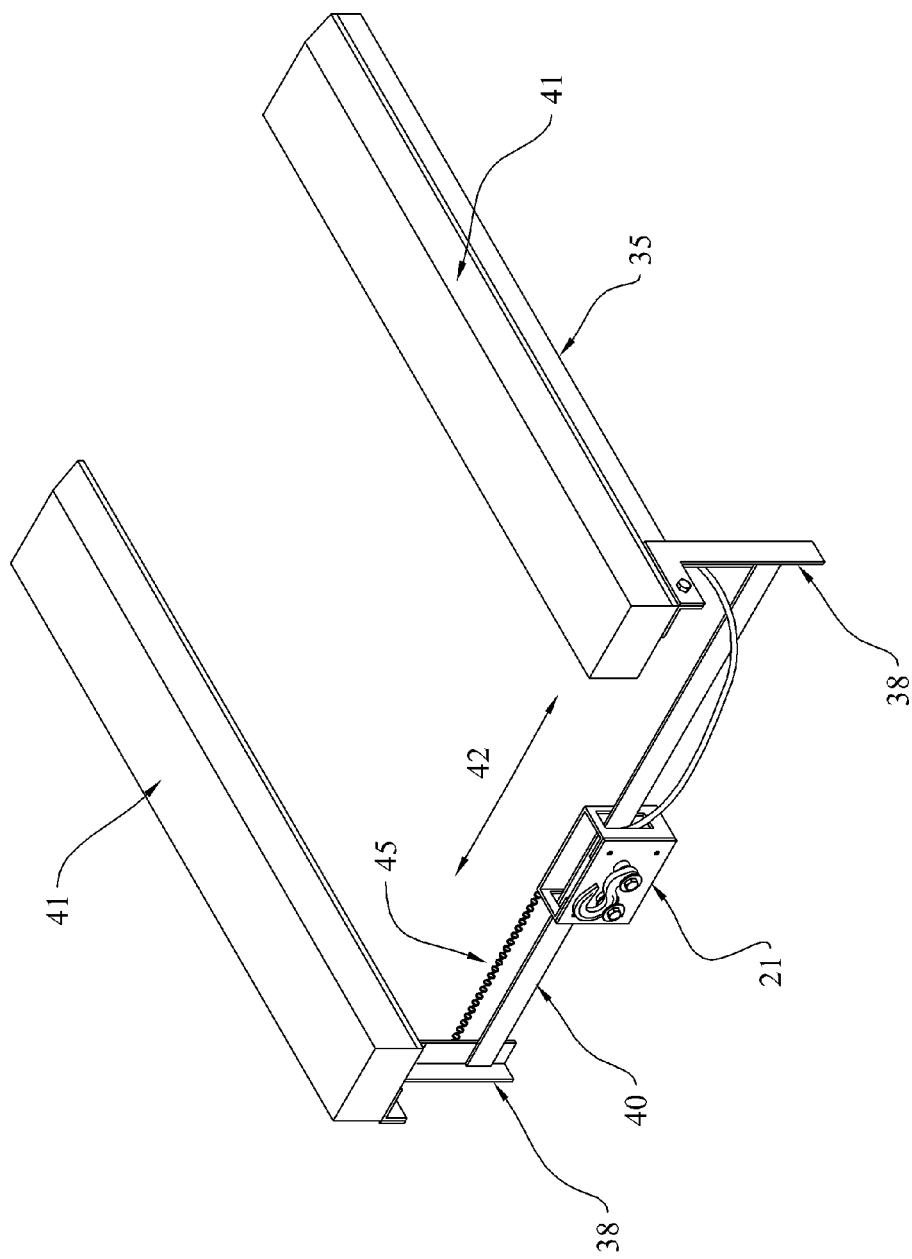
FIG. 8 is a side perspective view of the bow cradle assembly rails with the attached bow cradle alignment guides of the present invention.

FIG. 8 depicts the bow cradle assembly rails 35 with the attached alignment guides 41. Slidably attached to the hook mechanism slide bar 40 is the hooking mechanism 21. In use, the hooking mechanism 21 slides horizontally along the slide bar 40 as indicated by the arrow 42.

Figure 9:
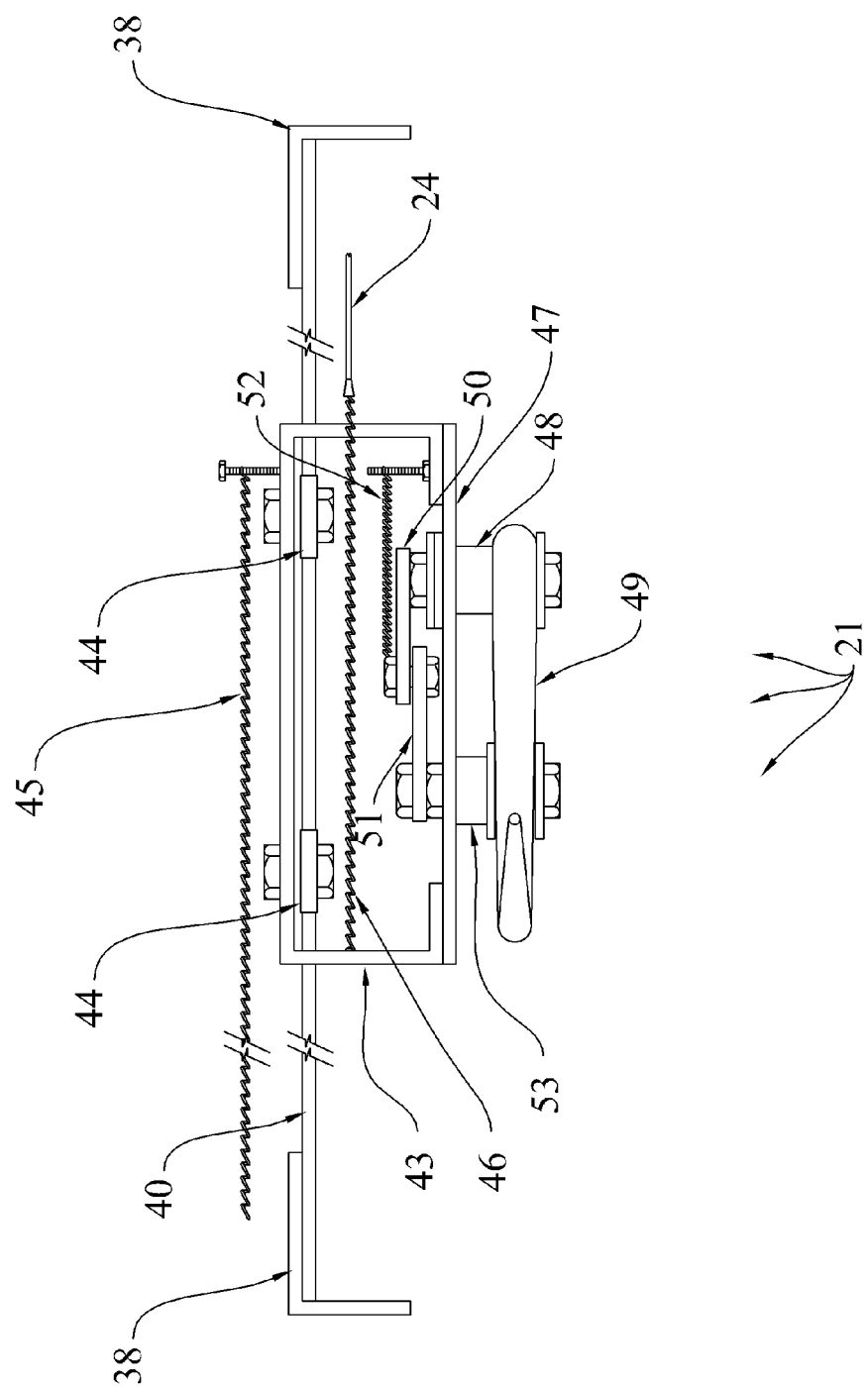
FIG. 9 is a planar top down end view of the hooking mechanism of the present invention.

FIG. 9 is a top down view of the hooking mechanism 21 slidably attached to the slide bar 40. The hooking mechanism includes a frame 43. Rotatably mounted to the frame are four (4) rollers 44 (only two of which are shown) that ride on the slide bar 40. Two of the rollers 44 ride on the top of the slide bar 40 and the other two rollers 44 ride on the bottom of the slide bar 40 thereby preventing the hooking mechanism from disengaging from the slide bar 40. Attached to the outside of the frame 43 is a first expansion spring 45 which is connected at one end to the hooking mechanism frame 43 and at the other end to one of the hook mechanism support bars 38 shown in FIG. 8. When not in use, the first expansion spring 45 maintains the hooking mechanism 21 in a position to the left side of the slide bar 40. The cable 24 that is attached at a first end to the second triggering linkage (as depicted in FIG. 5) is attached at a second end to a first end of a second expansion spring 46. The second end of the second expansion spring 46 is attached to the hooking mechanism frame 43.

Attached to the hooking mechanism frame 43 is a hook plate 47. Rotatably and slidably attached to the hook plate 47 is a pivot pin 48. At a first end of the pivot pin 48 is attached a boat hook 49 and at a second end is attached a first end of a first hook linkage bar 50. The boat hook 49 is normally biased towards the fixed pin 53 by an expansion spring (not shown). At the second end of the first hook linkage bar 50 is rotatably attached a first end of a second hook linkage bar 51. Also attached to the second end of the first hook linkage bar 50 is a third expansion spring 52 which is also attached to the hooking mechanism frame 43. The second end of the second hook linkage bar 51 is rotatably connected to a fixed pin 53 mounted in the hook plate 47.

Figure 10:
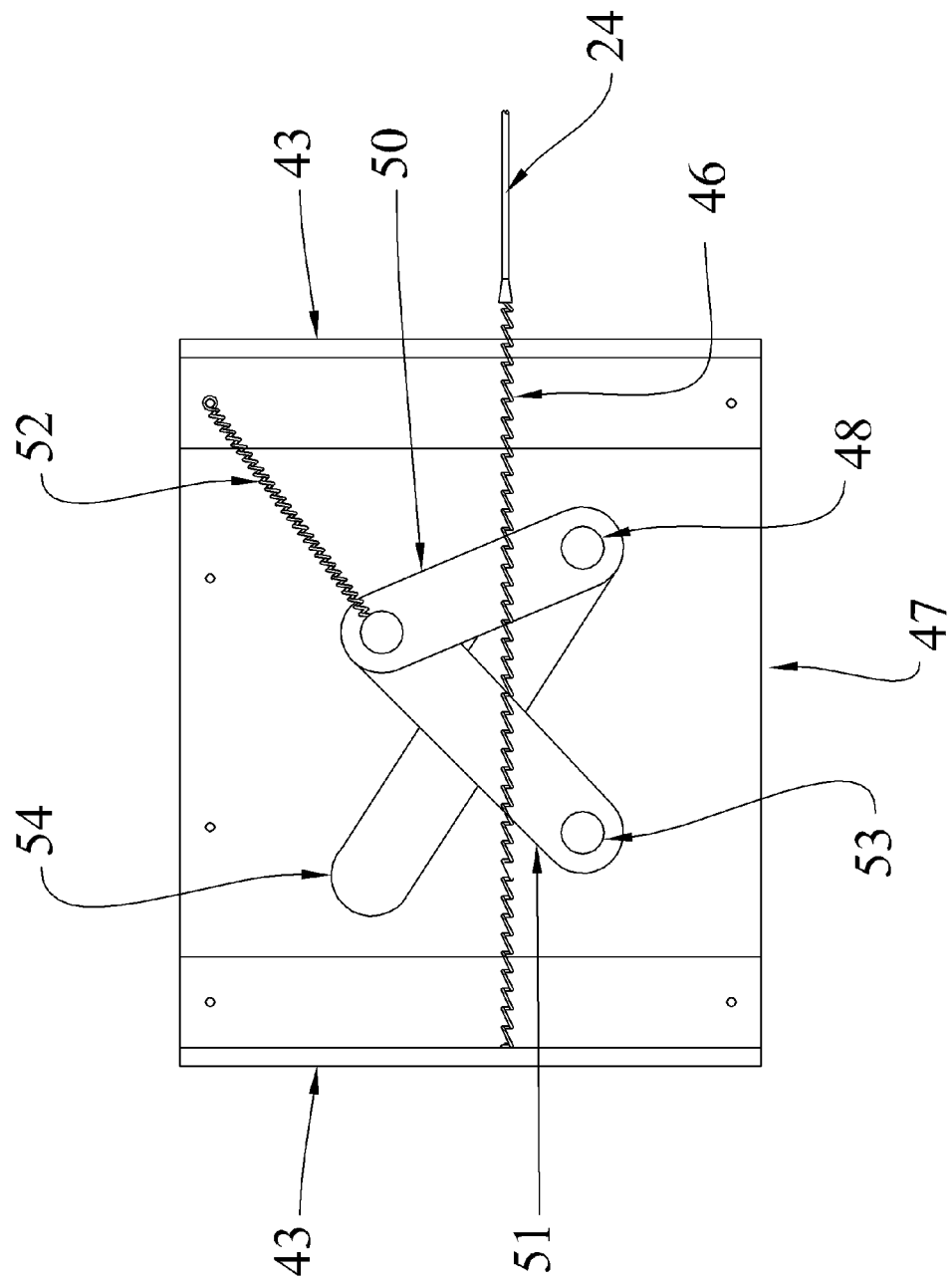
FIG. 10 is a planar inside view of the hook plate of the present invention.

FIG. 10 depicts the inside view of the hook plate 47 and hook linkage bars 50 and 51. The hook plate 47 is attached to the hooking mechanism frame 43. There is an angled through hole slot 54 cut out of the hook plate 47. The slideable and rotatable pin 48 rides in the slot 54. The first hook linkage bar 50 is attached to the slideable and rotatable pin 48 at one end and to a first end of the second hook linkage bar 51 at the other end. The third expansion spring 52 is attached to the second end of the first hook linkage bar 50 and to the frame 43. The third expansion spring 52 keeps the hook 49 in a normally open position ready to receive a bow ring 63 of a watercraft 65. The second end of the second hook linkage bar 51 is rotatably attached to the pin 53. The cable 24 is attached to the second expansion spring 46 which is in turn attached to the hooking mechanism frame 43.

Figure 13:
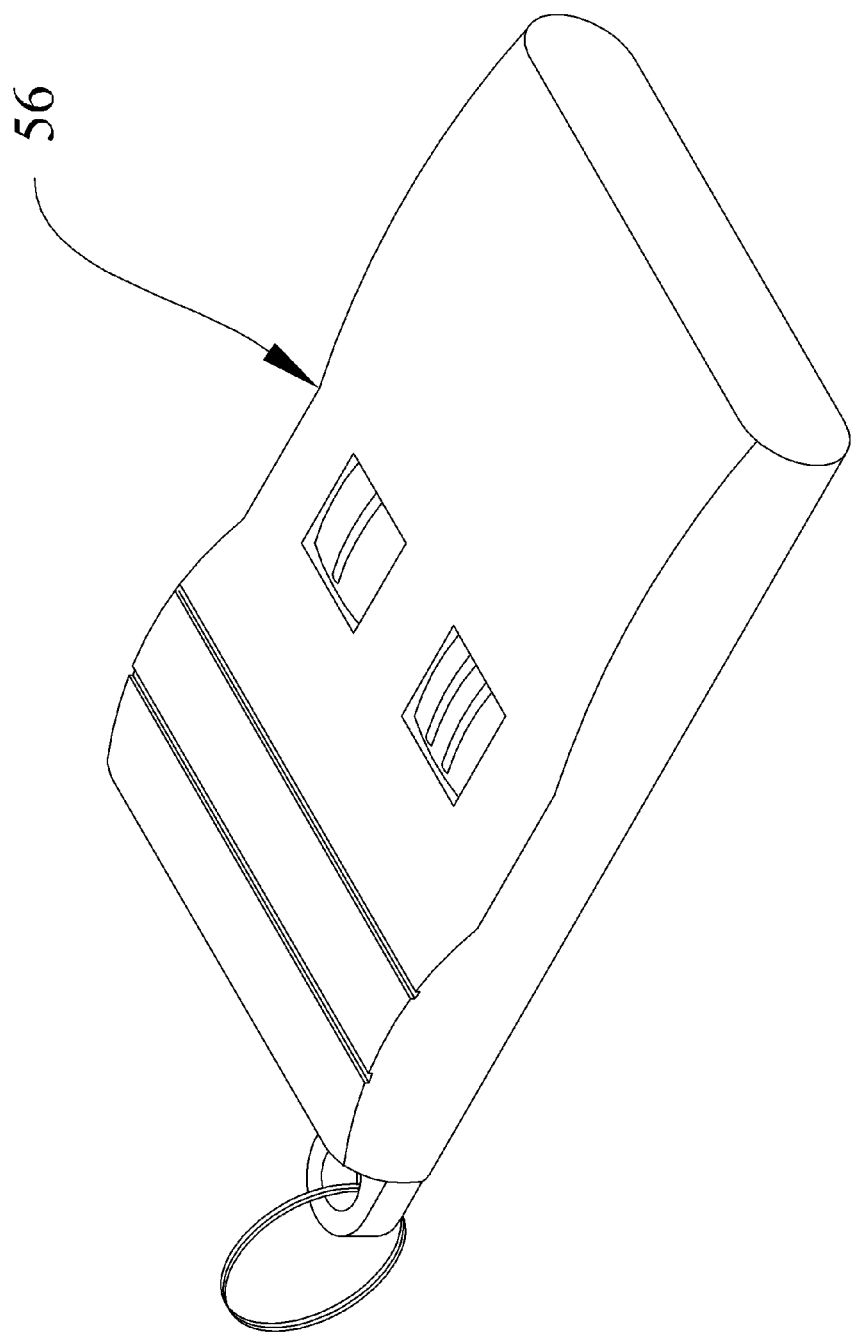
FIG. 13 is a perspective view of the key chain remote of the present invention.

As a means for a single user to remotely retrieve a motor powered watercraft 65, a user backs a watercraft trailer 2 down a watercraft ramp 66 (shown in FIG. 14) into the water. The user enters the watercraft 65 and uses a remote control means comprising a key chain remote 56 (shown in FIG. 13) as a means to release the power winch 6 and strap 55 means shown in FIGS. 1 and 2. The tension means comprising a constant tensioner wheel 13 that provides the means to pull the dolly assembly 3 toward the rear of the trailer 2. The hooking means for keeping the hook 49 in its normally open position is accomplished when the triggering linkage roller 33 intersects the rear cutout 27, the hooking mechanism 21 stays to the right hand side as viewed from inside the boat which keeps the hook 49 in its normally open position. The user then drives the watercraft 65 towards the dolly assembly 3 and the bow cradle assembly 20. As a means for engaging the bow hook 49 with the bow ring 63, as the watercraft 65 enters the dolly assembly 3, the bow ring 63 contacts the bow stop 37 and the watercraft 65 pushes the dolly assembly 3 forward on the dolly track rails 4 until the triggering means is activated by the triggering linkage roller 33 intersecting with the forward cutout 26. This causes the triggering linkages 30 and 31 to move thereby causing the triggering cable 24 to move. As the cable 24 moves, it pulls on the second expansion spring 46 which pulls the hooking mechanism 21 to the left, when viewed from inside the boat, overcoming the force of the first expansion spring 45. When the bow hook 49 encounters the bow ring 63 of a watercraft 65, the hooking mechanism 21 stops moving but the cable 24 continues to pull on the frame 43 causing the hook mechanism 21 to remain in place. Once the watercraft 65 is located in the bow cradle assembly 20 and the hook 49 is aligned with the bow ring 63, the user uses the remote control means comprising the key chain remote 56 which sends a signal to the power winch means as a means to engage the power winch 6 means.

Attached to the power winch 6 means is the strap 55 means (shown in FIG. 1) that is attached to the hook 49. When activated, the power winch 6 means rewinds the strap 55 means which pulls on the hooking means 49 which first pivots the hook mechanism support bars 38 and the attached hooking mechanism 21 to pull the hooking mechanism 21 in alignment with the bow ring 63 of a watercraft 65 and then slides the hooking means 49 in the slot 54 in the hook plate 47 causing the hooking means 49 to rotate and fully engage the bow ring 63 of a water-craft. As a means to align the water craft with the boat trailer 2 and a means to fully load the watercraft 65 on the trailer 2, the continued operation of the power winch 6 means causes the watercraft 65 to align itself with the boat trailer 2 and causes the watercraft 65 and dolly assembly 3 to move up onto the boat trailer 2 in a fully loaded position. As a means to automatically turn off the power winch 6, there is an automatic power winch cutoff switch 8 mounted on the post arm 5 shown in FIGS. 1 and 2. When the bow stop 37, shown in FIG. 6, encounters a power winch shutoff means comprising the cutoff switch 8, the power to the power winch 6 is terminated and the watercraft 65 is fully loaded and secured. The trailed watercraft 65 and trailer 2 can then be pulled out of the water by a tow vehicle 64 (shown in FIG. 14).

Figure 11:
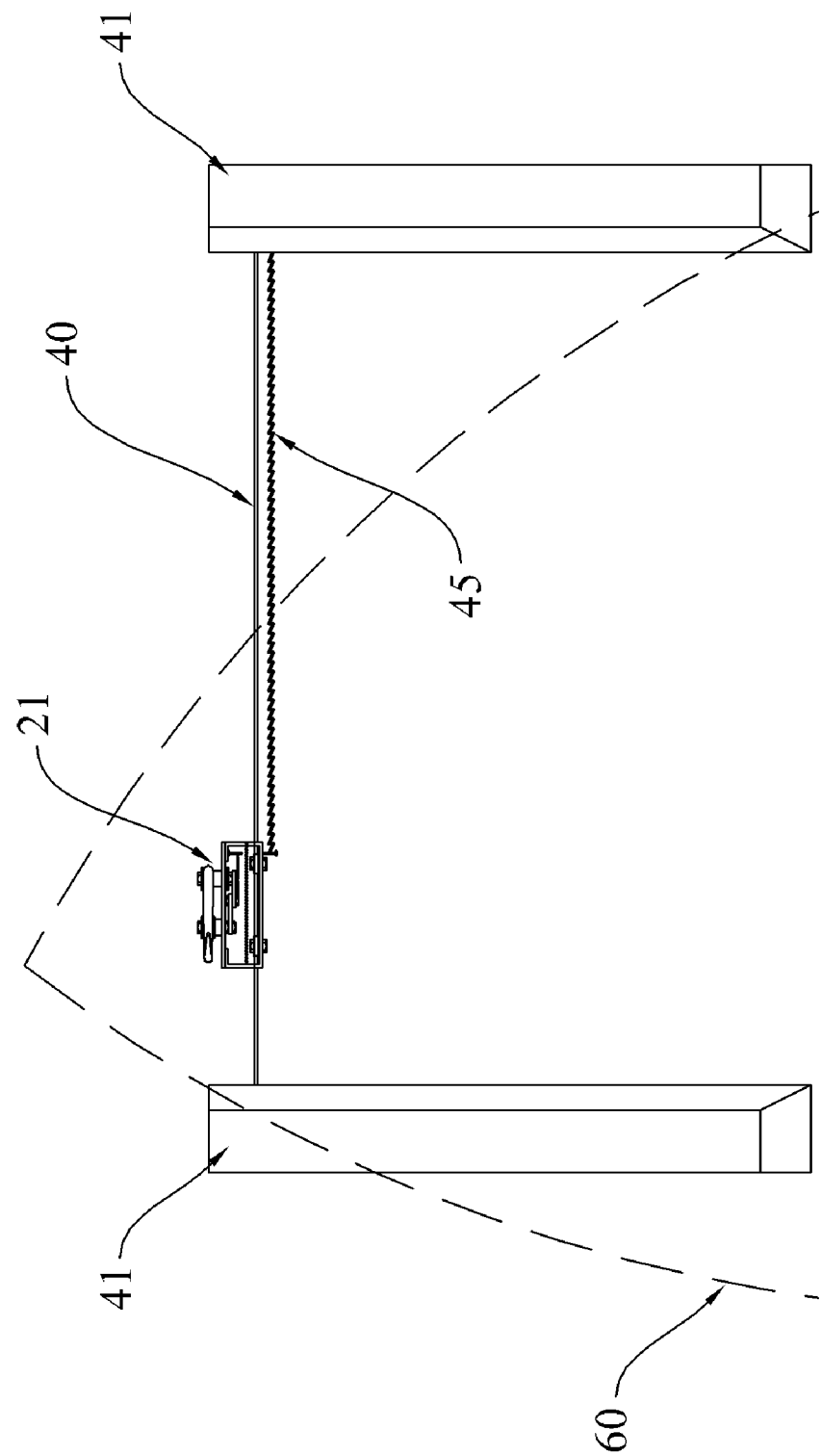
FIG. 11 is a top planar view of the bow cradle with the bow of a boat in misalignment to the left side of the present invention.
Figure 12:
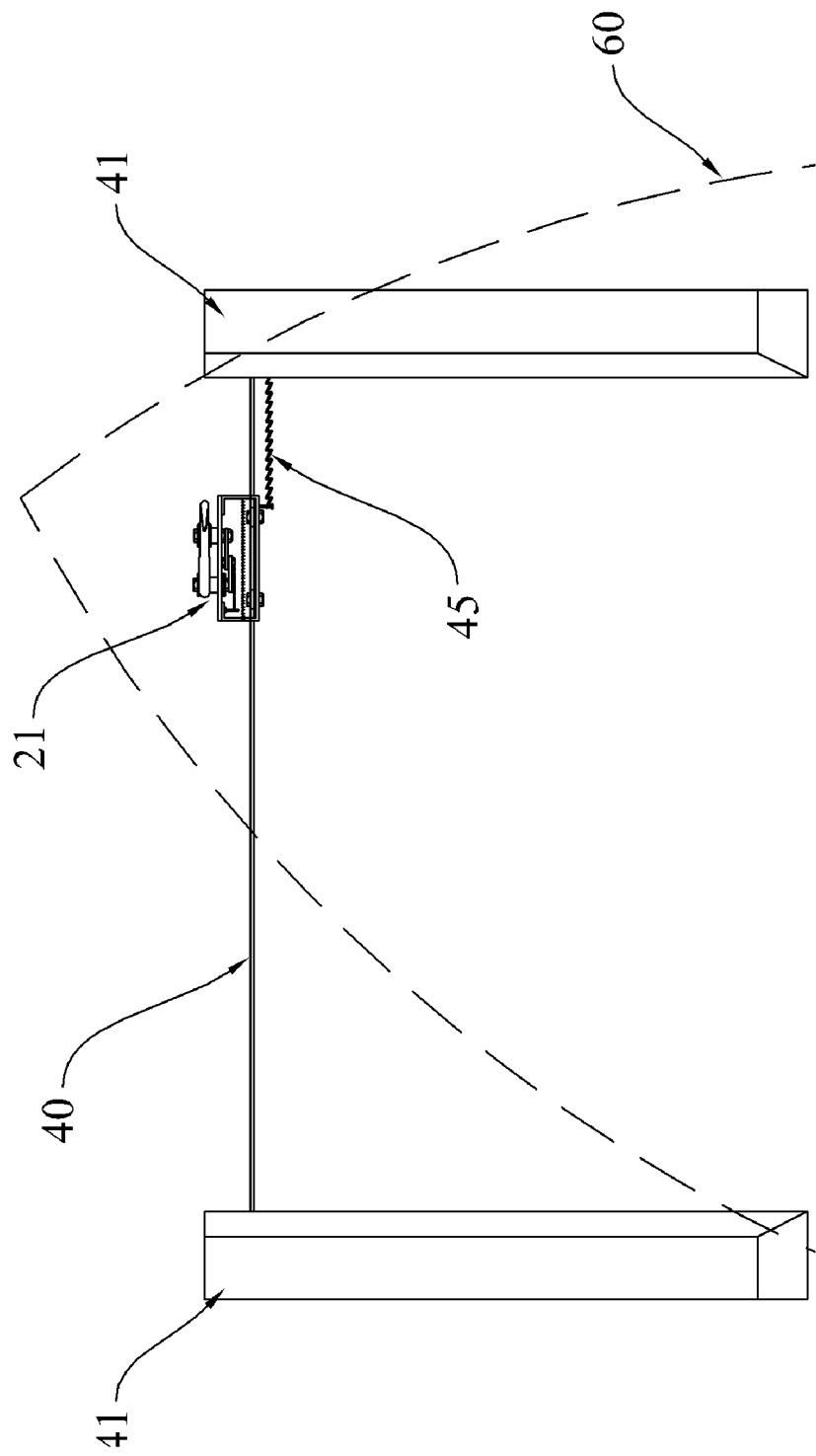
FIG. 12 is a top planar view of the bow cradle with the bow of a boat in misalignment to the right side of the present invention.

As depicted in FIGS. 11 and 12, and from the description and attached drawings of the bow cradle assembly 20 and the hooking mechanism 21, the present invention provides a means for a wide degree of initial misalignment of a watercraft 65 to the bow cradle alignment guides 41 as the hooking mechanism 21 has a full range of movement on the slide bar 40 between the bow cradle assembly rails 35. FIG. 11 depicts a boat bow 60 in phantom lines approaching the alignment guides 41 at a sharp left angle to the alignment guides 41. The hooking mechanism 21 has traversed across the slide bar 40 to its far left position in order to engage the bow ring 63 (shown in FIG. 14). FIG. 12 depicts a boat bow 60 in phantom lines approaching the alignment guides 41 at a sharp right angle to the alignment guides 41. When viewed from inside the boat, the hooking mechanism 21 is in it far right position on the slide bar 40 in order to engage the bow ring 63. This design enables a single user to approach the dolly assembly 3 with less than perfect alignment and still easily and conveniently engage the hooking mechanism 21 to secure the watercraft 65 to the trailer 2. The amount of misalignment a watercraft 65 can have with the centerline of the trailer 2, and still be effectively engaged by the sliding hooking mechanism 21, is determined by the width of the bow cradle frame 34 and the length of the mechanism slide bar 40 which is determined by the hull design width of the chosen watercraft 65. Other types of springs or triggering mechanisms could be substituted for those presented above in order to effectuate the operation of this invention without deviating from the present invention.

As a means for a single user to remotely launch a watercraft 65, a user backs the trailer 2, with attached watercraft 65, down a watercraft ramp 66 and into the water. The watercraft 65 then begins to float on the water while the trailer 2 sinks. The user then enters the watercraft 65 and uses a remote control means comprising a key chain remote 56 which sends a signal to the power winch means as a means to release the power winch and strap 55 means. Released from the tension of the power winch, the constant tensioner cable wheel 13 provides the means to pull the dolly assembly 3 toward the rear of the trailer 2. A triggering means for releasing the bow ring 63 from the hook 49, is activated when the triggering linkage roller 33 intersects the rear cutout 27 on the position lever rail 25, the triggering linkages 30 and 31 move thereby causing the cable 24 to move which allows the first expansion spring 45 to pull the hooking mechanism 21 to the right which causes the hook 49 to return to its normally open position thereby releasing the bow ring 63 of a watercraft 64 from the hooking mechanism 21.

To anyone skilled in the art, the fundamental precepts and arrangement of the foregoing invention could be easily adapted to the loading and unloading of numerous items onto trailers or trucks, such as but not limited to, four wheel ATV's, tractors, forklifts, dozers, backhoes, loaded pallet skids, crates and the like without departing for the scope and intent of the invention. All that is required is a ramp with a slidable dolly attached to the ramp along with the remainder of the present invention.

I claim:

1. A method for a single user to remotely launching a watercraft from a watercraft trailer, comprising:
    having a user back said trailer with said watercraft removably attached to a bow cradle assembly by a hook and power winch means down a watercraft ramp and into a body of water with the use of a tow vehicle, said bow cradle assembly being pivotally attached to a movable dolly means;
    having a user exit said tow vehicle and enter said watercraft;
    having said user operate a remote control means for activating said power winch means which releases said power winch means;
    having a tension means attached at a first end to said trailer and at a second end to said movable dolly means for pulling said movable dolly, said bow cradle assembly and attached watercraft proximate the rear of said trailer; and
    having a triggering means that automatically releases said hook from said watercraft once said dolly, said bow cradle assembly and said watercraft are proximate the rear of said trailer, thereby launching said watercraft.

2. A method for a single user to remotely retrieving a motor powered watercraft to a watercraft trailer, comprising:
    using a tow vehicle to back said watercraft trailer down a ramp and into the water;
    remotely activating a remote control means that releases a power winch and strap means;
    providing a tension means for pulling a movable dolly assembly toward the rear of said trailer;
    providing a hooking means to keep a bow hooking means in a normally open position;
    powering said watercraft onto a bow cradle assembly, said bow cradle assembly being pivotally mounted to said moveable dolly, said dolly being movably mounted to said trailer;
    driving said watercraft, said bow cradle assembly and said movable dolly forward on said trailer until a triggering means mounted on said dolly is triggered, said triggering means causing a pivotal and slideable hooking means to move into a position and engage said hooking means with a bow ring on said watercraft;
    activating a remote control means, said remote control means activating said power winch and strap means attached to said hooking means which pulls said watercraft into alignment with said trailer and into a fully retrieved position on said trailer, said power winch and strap means being turned off when a bow stop contacts a power winch shutoff means.

3. A method for remotely retrieving a motor powered watercraft to a watercraft trailer according to claim 2 wherein said hooking means has horizontal movement range equal to the distance between the bow cradle assembly rails to accommodate retrieving a watercraft bow that is off-center to said trailer.

* * * * *